United States Patent [19]
Dragisic

[11] Patent Number: 4,480,385
[45] Date of Patent: Nov. 6, 1984

[54] TOOL AND METHOD FOR TERMINATING ELECTRICAL CONDUCTORS IN CONTACT MEMBERS

[75] Inventor: Joseph Dragisic, Cicero, Ill.

[73] Assignee: Allied Corporation, Morris Township, Morris County, N.J.

[21] Appl. No.: 83,872

[22] Filed: Oct. 11, 1979

[51] Int. Cl.[3] .................... H01R 43/04; B23P 19/00
[52] U.S. Cl. .................................... 29/866; 29/751; 29/753
[58] Field of Search .................. 29/868, 751, 753, 866

[56] References Cited

U.S. PATENT DOCUMENTS

| | | |
|---|---|---|
| 3,145,261 | 8/1964 | Forney, Jr. . |
| 3,182,282 | 5/1965 | Turner . |
| 3,249,983 | 5/1966 | Cobaugh . |
| 3,571,890 | 3/1971 | Brehm ............................ 29/751 X |
| 3,661,270 | 10/1971 | Eppler . |
| 3,668,615 | 6/1972 | Bury . |
| 3,771,208 | 11/1973 | Taylor et al. . |
| 3,866,294 | 2/1975 | McCaughey . |
| 3,867,005 | 2/1975 | Hoppe, Jr. . |
| 3,902,154 | 8/1975 | McKee . |
| 3,926,498 | 12/1975 | Hoppe, Jr. . |
| 3,937,403 | 2/1976 | Lawson . |
| 3,959,868 | 6/1976 | Mathe . |
| 3,962,901 | 6/1976 | Anderson et al. . |
| 3,997,959 | 12/1976 | McKee . |
| 4,025,998 | 5/1977 | Eppler . |
| 4,048,710 | 9/1977 | Nijman . |
| 4,048,839 | 9/1977 | Peterpaul . |
| 4,082,402 | 4/1978 | Kinkaid et al. . |
| 4,159,156 | 6/1979 | Nijman . |
| 4,264,118 | 4/1981 | Nijman ........................... 339/99 R |

*Primary Examiner*—Howard N. Goldberg
*Assistant Examiner*—Carl J. Arbes
*Attorney, Agent, or Firm*—Roger H. Criss

[57] ABSTRACT

A tool and method are disclosed for terminating an electrical conductor to a contact member premounted in an electrical connector or the like, wherein the contact member has a terminal portion with a pair of spaced conductor engaging elements. The conductor is inserted into the contact member to seat the conductor within the terminal portion and make electrical engagement between the conductor and the spaced engaging elements. Simultaneously with the insertion of the conductor, sidewall portions of the contact member between the conductor engaging elements are crimped onto the conductor to mechanically retain the conductor in electrical engagement with the contact member. The novel tool includes a pair of crimping curved surface portions for shearing wall portions of the contact sidewalls between the conductor engaging elements and holding the sheared wall portions onto the conductor, with the surface portions intersecting along a common edge portion.

28 Claims, 5 Drawing Figures

TOOL AND METHOD FOR TERMINATING ELECTRICAL CONDUCTORS IN CONTACT MEMBERS

BACKGROUND OF THE INVENTION

The present invention is directed generally to solderless electrical connections and, more particularly, to a novel tool and method for terminating an insulated conductor into a portion of an electrical contact premounted in an electrical connector.

In recent years, increasing numbers of applications have developed in the communications, data processing and transportation industries requiring electrical connectors which provide reliable solderless interconnections with insulated electrical conductors. This demand has perhaps been greatest in the telecommunications industry where miniaturized, high contact density ribbon connectors are used extensively. Connectors of this general type are disclosed in U.S. Pat. Nos. 3,867,005; 3,902,154; and 3,926,498. Because of the great number of individual conductors terminated in these connectors and because of the close spacing between the individual contacts, reliable solder terminations are difficult to achieve, as well as time consuming and costly to maintain and service. For these reasons, insulation-piercing contacts have been developed for use in ribbon connectors and have met with wide acceptance when used to terminate insulated conductors having solid wire cores. Unfortunately, due to the demanding standards in the industry requiring almost negligible change in contact resistance, the insulation-piercing type ribbon connectors have proven unacceptable when used with stranded wire core conductors. Experience has shown that tensile forces applied to the conductors, as well as the cold flow of the insulation surrounding the core, causes the individual strands of the wire core to move and reposition within the insulation-piercing contacts, causing changes in contact resistance. Thus, solder termination ribbon connectors are still used widely with stranded core insulated conductors.

Accordingly, a need exists for a ribbon connector which provides a satisfactory solderless termination to stranded core insulated conductors, and preferably both stranded and solid core conductors can be used with the present invention. In addition, in order that the connector be commercially practicable, the termination can be performed with the electrical contact premounted within the connector.

One approach to solving these problems is shown in U.S. Pat. No. 4,159,156 which is assigned to the assignee of the present invention. In that patent, an electrical contact member having a terminal portion is premounted in an electrical connector. The terminal portion is formed by an outwardly open channel which has a pair of contact sidewalls and a pair of spaced conductor engaging elements in the form of opposed detents. The tool and method of that patent comprises shearing portions of the actual conductor engaging detent elements and bending the sheared portions onto the conductor.

Another termination tool and method is shown in pending U.S. application Ser. No. 042,465, filed May 25, 1979, which is a continuation of parent application Ser. No. 897,076, filed Apr. 17, 1978 and now abandoned and U.S. Pat. No. 4,264,118 which is a continuation of Ser. No. 897,076, both of which are assigned to the assignee of the present invention. In those pending applications, sidewall portions of the contact terminal portion, other than the conductor engaging detent elements (as in U.S. Pat. No. 4,159,156), are sheared and crimped onto the conductor which previously is inserted into the contact channel. However, in this application, a bifurcated termination tool head is employed to perform a two-step terminating operation whereby the conductor first is inserted into the contact and the sidewalls of the contact thereafter are crimped onto the conductor. The disclosure of these two pending applications is incorporated herein by reference for the general purpose of showing types of connector structures with which the present invention is applicable.

SUMMARY OF THE INVENTION

The present invention, therefore, is directed to a tool and method for terminating insulated conductors into a portion of an electrical contact which may be premounted in an electrical connector, and simultaneously crimping portions of the contact other than the conductor engaging elements thereof onto the conductor to mechanically retain the conductor in electrical engagement with the contact member.

In the exemplary embodiment of the invention, the electrical contact member has a terminal portion which is defined by an open channel formed by a pair of contact sidewalls. Two conductor engaging elements in the form of pairs of inwardly directed detents are formed in the contact sidewalls along the channel defined by the terminal portion.

The tool includes an insertion and crimping head or member which has insertion means for engaging and inserting a conductor into the contact channel and make electrical engagement between the conductor and the spaced pairs of conductor engaging elements. Crimping means is provided on the member for engaging and shearing wall portions of the contact sidewalls other than the conductor engaging elements simultaneously with the insertion of the conductor by the insertion means, and forming the sheared wall portions onto the inserted conductor within the channel.

The insertion means of the tool head includes spaced, generally planar end portions or faces for engaging and inserting the conductor, and the crimping means of the tool is disposed between the spaced insertion portions for shearing wall portions of the contact sidewalls between the spaced conductor engaging elements simultaneously with the insertion of the conductor.

The crimping means of the tool head or member includes a pair of curved surface portions for folding the sheared wall portions onto the conductor to mechanically retain the conductor in engagement with the conductor engaging elements. The curved surface portions intersect each other along a common edge portion whereby the centers of curvature of the curved surface portions are sufficiently close to each other to completely fold the sheared contact wall portions onto the conductor without distorting the original contact configuration and without disturbing the connection between the conductor and the contact conductor engaging elements, thereby eliminating many of the problems with prior termination tools and methods of the character described.

Other objects, features and advantages of the invention will be apparent from the following detailed description taken in connection with the accompanying drawings.

DETAILED DESCRIPTION OF THE INVENTION

Figure 1:
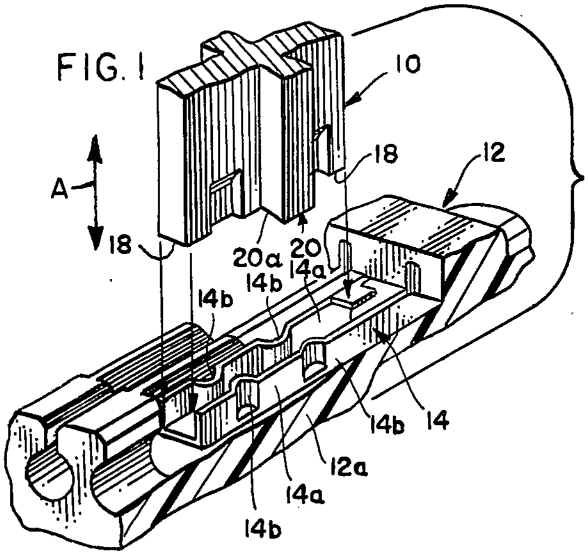
FIG. 1 is a fragmented perspective view of the termination tool of the present invention spaced above a contact which is shown, premounted in an electrical connector.

Referring to the drawings in greater detail, and first to FIG. 1, the termination tool of the present invention includes a termination member or head, generally designated 10, which is appropriately mounted on a vertically reciprocating support means in a composite tool as is well known in the art. The tool head 10 is movable toward and away from an electrical connector, generally designated 12, which has an electrical contact, generally designated 14, premounted therein. The movement of the tool head 10 is shown generally by the double headed arrow A. Although the invention has been set forth in the Background and Summary portions as having particular utility in a ribbon connector of the type shown in the aforesaid pending applications assigned to the assignee of the present invention, it is to be understood that the invention is contemplated for use with single conductors in a wide range of applications. The electrical connector 12 referred to herein is contemplated to encompass any type of dielectric connector insert **12*a* (FIG. 1) having an electrical contact 14** mounted therein.

Figure 2:
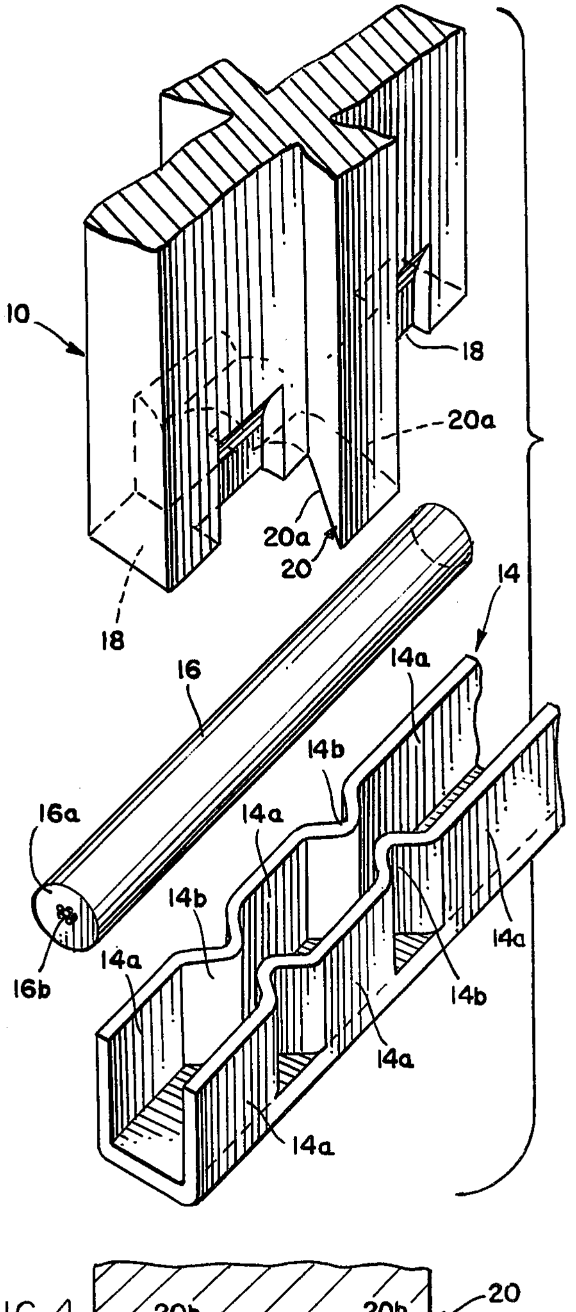
FIG. 2 is an exploded perspective view, on an enlarged scale, showing the termination tool similar to the showing in FIG. 1, in combination with a subjacent insulated conductor and the terminal portion of a channel shaped contact member.
Figure 5:
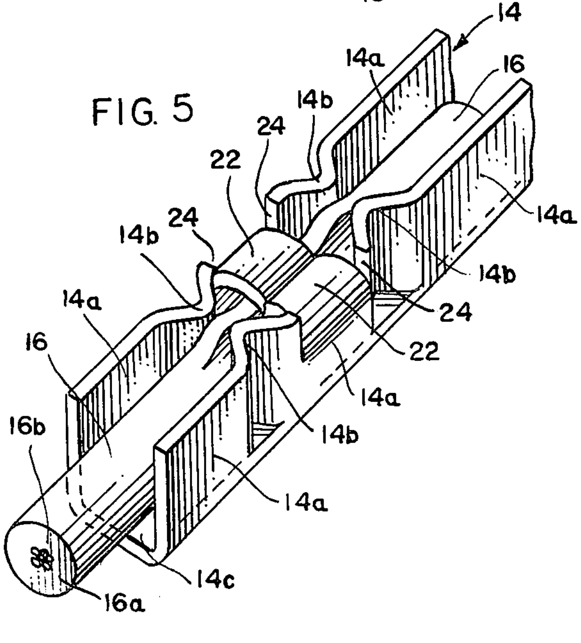
FIG. 5 is a perspective view of the insulated conductor and contact terminal portion shown in FIG. 2, with the conductor fully inserted and terminated within the terminal portion.

Referring to FIGS. 2 and 5 where the terminal portion of the contact member 14 is best shown, the terminal portion has an elongated outwardly open channel configuration formed by a pair of contact sidewalls **14*a* which are interrupted along their lengths by conductor engaging elements formed by two pairs of opposing, inwardly directed detents 14*b*. As can be seen in FIGS. 2 and 5, the two opposing pairs of conductor engaging detents 14*b* are spaced along the length of the channel shaped terminal portion of the contact 14 so that lengths of the sidewalls 14*a* are disposed therebetween. The sidewalls 14*a* of the contact terminal portion are joined by a base or bottom wall 14*c***.

The electrical connector 12 and insert **12*a* are designed to permit crimping and termination of an insulated conductor 16 within the contact 14** while the contact or contacts are mounted in place in the connector. Since the present invention has a wide range of applications, the details of mounting the contact within the connector are not described herein and the disclosures of the aforementioned U.S. Pat. No. 4,159,156 and pending applications Ser. Nos. 042,465 and 897,076 are incorporated herein by reference.

The termination tool member or head 10 of the present invention includes insertion means for engaging and inserting the conductor 16 into the channel shaped terminal portion of the contact 14 and make electrical engagement between the conductor 16 and the conductor engaging elements **14*b*. The insertion means includes a pair of spaced, generally planar end faces 18 (FIG. 3) having generally "H" shapes. These planar end faces are generally coplanar with each other for uniformly engaging the conductor 16 and inserting the conductor between the conductor engaging elements or detents 14*b* whereby the detents pierce insulation 16*a* of the conductor 16 and establish electrical termination with a single core or a stranded core 16*b* of the conductor. These detents 14*b* create little disturbance of the stranded conductor 16*b*** and practically negligible change in contact resistance.

Figure 3:
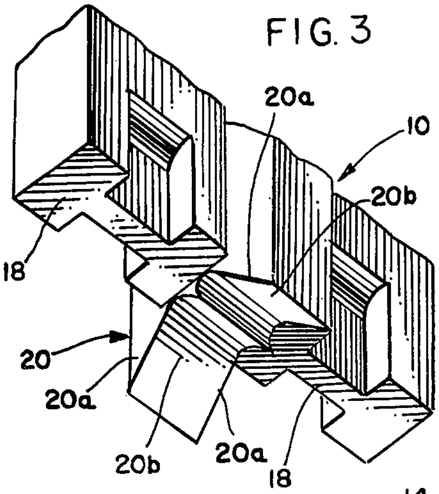
FIG. 3 is a perspective view of the underside of the termination tool of FIGS. 1 and 2, showing the spaced insertion means and the crimping means therebetween.

The termination tool member or head 10 also includes crimping means for engaging and shearing wall portions of the contact sidewalls **14*a* between the conductor engaging detents 14*b* simultaneously with the insertion of the conductor 16 by the insertion faces 18. More particularly, as best shown in FIGS. 2 and 3, crimping means, generally designated 20, is formed on the underside of the termination head 10 between the insertion faces 18. The crimping means includes a pair of spaced cutting edges 20*a* on each side of the head for engaging and shearing sidewall portions of the contact sidewalls 14*a* between the conductor engaging detents 14*b*. A pair of curved surface portions 20*b* are disposed between the cutting edges 20*a* for folding the sheared wall portions of the contact onto the conductor 16 to mechanically retain the conductor in engagement with the conductor engaging detents 14*b***.

Referring to FIG. 5, the terminal portion of a contact 14 is shown with a conductor 16 fully inserted and terminated therein, and with sidewall portions 22 of the contact sidewalls **14*a* folded onto the conductor. The cutting edges 20*a* of the crimping means 20 of the termination tool 10 are effective to shear the contact sidewalls, as at 24 in FIG. 5, to leave the sheared wall portions 22 for forming by the curved surfaces 20*b* onto the conductor 16**.

Figure 4:
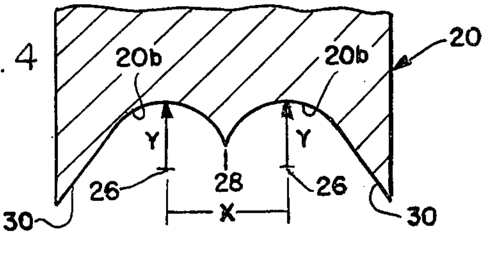
FIG. 4 is a vertical sectional view through the crimping portion of the termination tool.

As stated heretofore, it is important that there be negligible change in the contact resistance when connections of the character described herein are made. This includes little disturbance of the stranded conductor **16*b* of the insulated conductor 16. Detent type conductor engaging elements, such as 14*b*, have been quite effective in maintaining proper contact resistance and little conductor disturbance. However, many crimping operations heretofore performed drastically change the characteristics of the conductor engagement in the areas between the engaging detents 14*b*. FIG. 4 shows an end view of the curved surface portions 20*b* of the crimping head 10. The radii of curvature of the curved surface portions are designated by the designation "Y" and the distance between the centers of curvature 26 of the surface portions is designated by the distance "X". It can be seen that the distance X between the centers 26 of curvature of the pair of curved surface portions 20*b* is less than twice the radii of curvature of the surface portion. With this construction, the curved surface portions 20*b* intersect each other along a common edge portion 28 extending lengthwise of the conductor 16 and contact 14. In practice, it has been found effective to form the crimping portion 20 of the tool such that the distance X between the center 26 of curvature of the pair of curved surface portions 20*b*** verses the radii of curvature of the surface portions is on the order of 5:3.

With the construction or configuration of the curved surface portions **20*b* of the crimping means 20 shown in FIG. 4, the sheared wall portions 22 (FIG. 4) of the contact 14 are "gently" folded onto the conductor 15 without disturbing the critical conductor engagement between the insulation piercing detents 14*b* of the contact. Furthermore, it can be seen from FIG. 4 that the outer portions 30 of the curved surfaces 20*b* are flared somewhat out of their radii of curvature toward a more tangential direction. The "bending" or "clamping" action of prior crimping tools of the character described herein is eliminated by the vastly improved crimping tool of the present invention. Not only is the crimping action improved, but the crimping operation of the termination method of the present invention is performed and carried out simultaneously with the insertion of the conductor 16 within the contact 14, again resulting in practically negligible change in contact resistance and little or no disturbance of the strands 16*b* of the insulated conductor 16**.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A method of terminating an electrical conductor to a contact member premounted in an electrical connector, said contact member having a terminal portion including at least one conductor engaging element, said method comprising the steps of:

inserting the conductor into the contact member by engaging the conductor in line with said element to seat the conductor within said terminal portion and make electrical engagement between the conductor and said element; and simultaneously shearing a segment of the contact member from a wall of said terminal portion other than said element and forming the sheared segment onto said conductor to mechanically retain said conductor in electrical engagement with said contact member.

2. The method of claim 1 wherein said terminal portion comprises a generally U-shaped channel and said conductor engaging element comprises a pair of detents extending inwardly from opposing sidewalls of said channel, and said shearing step includes shearing said segment from at least one of said sidewalls.

3. The method of claim 2 wherein a segment is sheared from both said sidewalls.

4. The method of claim 2 wherein said terminal portion includes two pairs of said detents spaced along said channel, and said shearing step includes shearing said segment from at least one of said sidewalls between said two pairs of detents.

5. The method of claim 4 wherein a segment is sheared from both said sidewalls.

6. The method claim 1 wherein said terminal portion is elongated in part and includes two spaced conductor engaging elements, and said shearing step comprises shearing said segment from a wall of said terminal portion between said spaced elements and forming said segment onto said conductor.

7. The method of claim 6 wherein said terminal portion comprises a generally U-shaped channel and each of said spaced conductor engaging elements comprises a pair of detents extending inwardly from opposing sidewalls of said channel, and said shearing step includes shearing said segment from at least one of said sidewalls between said spaced elements.

8. The method of claim 7 wherein a segment is sheared from both said sidewalls between said spaced elements.

9. A method for terminating an insulated conductor to a contact member premounted in an electrical connector, said contact member having a terminal portion including at least one element for piercing the insulation and engaging the core of the conductor, said method comprising the steps of:

inserting the conductor into the contact member by engaging the conductor in line with said element to seat the conductor within said terminal portion, pierce the insulation and make electrical connection between the conductor core and said element, and simultaneously shearing a segment of the contact member terminal portion other than said element and forming the sheared segment onto the conductor to mechanically retain the conductor core in electrical engagement with said contact member.

10. The method of claim 9 wherein said contact member terminal portion comprises a generally U-shaped channel housed within said connector, said insulation-piercing element comprises a pair of detents extending inwardly from opposing sidewalls of said channel, and said shearing step comprises shearing said segment from at least one of said sidewalls and forming said segment over said seated conductor.

11. The method claim 10 wherein a segment is sheared from both said sidewalls.

12. The method of claim 9 wherein said terminal portion includes two pairs of said detents spaced along said channel, and said shearing step includes shearing said segment from at least one of said sidewalls between said two pairs of detents.

13. The method of claim 12 wherein a segment is sheared from both said sidewalls.

14. The method of claim 9 wherein said terminal portion is elongated in part and includes spaced conductor engaging elements, and said shearing step comprises shearing said segment from a wall of said terminal portion between said spaced elements and forming said segment onto said conductor.

15. The method of claim 14 wherein said terminal portion is elongated in part and includes spaced conductor engaging elements, and said shearing step comprises shearing said segment from a wall of said terminal portion between said spaced elements and forming said segment onto said conductor.

16. The method of claim 15 wherein a segment is sheared from both said sidewalls between said spaced elements.

17. A tool for terminating an insulated conductor into a portion of an electrical contact which has an outwardly open channel formed by a pair of contact sidewalls and at least one conductor engaging element, comprising:

a member including insertion means aligned with said element for engaging and inserting a conductor into said channel and make electrical engagement between the conductor and said element; and crimping means on said member for engaging and shearing wall portions of said contact sidewalls other than said element simultaneously with the insertion of the conductor by said insertion means into engagement with said element, and forming the sheared wall portions onto the inserted conductor within said channel.

18. The tool of claim 17 wherein said contact includes two conductor engaging elements spaced along said channel, and wherein said insertion means includes spaced portions respectively aligned with said two spaced elements with said crimping means disposed therebetween for shearing wall portions of said contact sidewalls between said spaced elements.

19. The tool of claim 18 wherein said spaced portions of said insertion means have generally planar end faces for engaging and inserting the conductor.

20. The tool of claim 18 wherein said crimping means includes cutting edges for engaging and shearing said wall portions of said contact side walls, and curved surface means for folding the sheared wall portions onto said conductor to mechanically retain said conductor in engagement with said elements.

21. The tool of claim 20 wherein said spaced portions of said insertion means have generally planar end faces for engaging and inserting the conductor.

22. The tool of claim 20 wherein said crimping means includes a pair of curved surface portions for folding the sheared wall portions onto said conductors to mechanically retain said conductor in engagement with said elements.

23. The tool of claim 22 wherein said curved surface portions intersect each other along a common edge portion.

24. The tool of claim 23 wherein the distance between the centers of curvature of said pair of curved surface portions versus the radii of curvature thereof is on the order of 5:3.

25. The tool of claim 17 wherein said crimping means includes cutting edges for engaging and shearing said wall portions of said contact side walls, and curved surface means for folding the sheared wall portions onto said conductor to mechanically retain said conductor in engagement with said elements.

26. The tool of claim 17 wherein said crimping means includes a pair of curved surface portions for folding the sheared wall portions onto said conductor to mechanically retain said conductor in engagement with said elements.

27. The tool of claim 26 wherein said curved surface portions intersect each other along a common edge portion.

28. The tool of claim 27 wherein the distance between the centers of curvature of said pair of curved surface portions versus the radii of curvature thereof is on the order of 5:3.

* * * * *